(12) United States Patent
Inoue et al.

(10) Patent No.: US 6,294,599 B1
(45) Date of Patent: Sep. 25, 2001

(54) HIGHLY-RIGID, FLAME-RESISTANT POLYAMIDE COMPOSITE MATERIAL

(75) Inventors: Hirofumi Inoue; Kenji Tamura; Tsuguo Ebata; Masayuki Noguchi, all of Kawasaki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/529,009

(22) PCT Filed: Aug. 9, 1999

(86) PCT No.: PCT/JP99/04286

§ 371 Date: Apr. 6, 2000

§ 102(e) Date: Apr. 6, 2000

(87) PCT Pub. No.: WO00/08099

PCT Pub. Date: Feb. 17, 2000

(30) Foreign Application Priority Data

Jul. 8, 1998 (JP) .................................................. 10-224820

(51) Int. Cl.⁷ ....................................................... C08K 3/34
(52) U.S. Cl. .......................... 524/100; 524/101; 524/445; 524/446; 524/447
(58) Field of Search ..................................... 524/100, 101, 524/493, 445, 446, 447

(56) References Cited

U.S. PATENT DOCUMENTS

| | | | | |
|---|---|---|---|---|
| 3,516,959 | * | 6/1970 | Jonas | 524/446 |
| 6,103,805 | * | 8/2000 | Kojima et al. | 524/442 |
| 6,172,148 | * | 1/2001 | Weber | 524/100 |

FOREIGN PATENT DOCUMENTS

| | | | |
|---|---|---|---|
| 10-81510 | 3/1998 | (JP) | C01B/33/44 |
| 10-182141 | 7/1998 | (JP) | C01B/33/38 |
| WO98/16584 | * 4/1998 | (WO) . | |

* cited by examiner

Primary Examiner—Veronica P. Hoke
(74) Attorney, Agent, or Firm—Sughrue, Mion, Zinn, Macpeak & Seas, PLLC

(57) ABSTRACT

The present invention relates to a highly-rigid, flame-resistant polyamide composite material that is applicable to various uses such as in materials for electric and electronic parts, automobile parts, materials for house appliances, mechanical parts, and the like. The polyamide composite material according to the present invention is characterized in comprising (a) polyamide resin; (b) silicate complex comprising a layered silicate and triazine compound; (c) fibrous reinforcement; and (d) flame retarder. The polyamide composite material according to the present invention exhibits its a high flame resistance, a superior performance with respect to its mechanical property, thermal property, dimensional stability, and reduced warp.

3 Claims, No Drawings

HIGHLY-RIGID, FLAME-RESISTANT POLYAMIDE COMPOSITE MATERIAL

TECHNICAL FIELD

The present invention relates to a highly-rigid, flame-resistant polyamide composite material that exhibits less warp, and a superior performance with respect to molding-shrinkage, anisotropy, dimensional stability, flame-resistance, mechanical strength, heat-resistance, and improvement over problems associated with bleed-out, and mold deposit. The composite material according to the present invention may be applied to various uses, for example, in materials for electric and electronic parts, automobile parts, materials for house appliances, mechanical parts, and the like. The present application is based on the specification of Japanese Patent Application (First Publication No. Hei 10-224820), the contents of which are included in the present application.

BACKGROUND ART

Flame-resistant polyamide resins are widely used in material for electric and electronic parts, and automobile parts due to their superior mechanical properties, heat-resistance, and flame-resistance.

On the other hand, in order to improve performance with respect to mechanical strength and heat-resistance, fibrous fillers such as glass fiber, carbon fiber, whisker, and the like, are often mixed therein. However, such fibrous fillers creates problems such as warp, and an unfavorable appearance for molded products, and thus a method for using a plane filler such as talc, and the like, along with the fibrous filler, has been proposed in order to solve the aforementioned problems.

However, fillers which are used to impart the above improvements decrease the flame-resistance of the composite material, and thus, a large amount of flame retarder is required for the flame-resistant effects, creating problems associated with bleed-out and mold deposit of molded products.

Accordingly, a highly-rigid, flame-resistant polyamide composite material that exhibits a superior performance with respect to mechanical strength and heat-resistance while maintaining its flame-resistance property, wherein problems associated with warp, dimensional stability, bleed-out, and mold deposit are improved, is highly desired.

DISCLOSURE OF THE INVENTION

As a result of extensive research to solve the aforementioned problems, the inventors of the present invention have found that it is possible to solve the aforementioned problems by means of using a specific silicate complex, and the inventors have completed the present invention.

That is, the highly-rigid, flame-resistant polyamide composite material according to the present invention is characterized in comprising (a) polyamide resin, (b) silicate complex comprising a layered silicate and triazine compound, (c) fibrous reinforcement, and (d) flame retarder.

Such highly-rigid, flame-resistant polyamide composite material exhibits less warp, and a superior performance in molding-shrinkage, anisotropy, dimensional stability, flame-resistance, mechanical strength, and heat-resistance, and also improves the problem associated with bleed-out and mold deposit. In addition, it also provides a favorable appearance and processing properties.

BEST MODES FOR CARRYING OUT THE INVENTION

The polyamide resin (a) used in the present invention is a polymer comprising repeating units of an acid amide (—CONH—). Concrete examples of the polyamide resin may include polylactams such as polyamide 6, polyamide 11, polyamide 12, and the like; polyamides comprising a dicarboxylic acid and diamine such as polyamide 66, polyamide 610, polyamide 612, polyamide 46, and the like; copolyamides such as polyamide 6–66, polyamide 6–610, and the like; polyamide 6–6T (wherein T represents a terephthalic acid component); and semi-aromatic polyamides comprising an aromatic dicarboxylic acid such as isophthalic acid, and methaxylylene diamine or aliphatic diamine. These polyamide resins may be used alone or in combinations of two or more. Additionally, these polyamide resins are not constrained by their relative viscosity, type of terminal group, or concentration.

The silicate complex (b) used in the present invention is obtained by means of inserting or absorbing triazine compounds between layers of a layered silicate.

The layered silicate, used in the present invention, varies in its chemical composition and crystal structure, and is not established in terms of classification and nomenclature. The layered silicate used herein is characterized by its particular layered crystal, and belongs to the philo-silicates in mineralogy. In particular, examples of such may include a 2:1 type philo-silicate comprising two tetrahedral layers and one octahedral layer; and a 1:1 type philo-silicate comprising one tetrahedral layer and one octahedral layer. Representative minerals of the 2:1 type philo-silicate include smectite, vermiculite, mica, and chlorites. Representative minerals of the 1:1 type philo-silicate include kaolin, serpentine, and the like. Examples of the smectite group include saponite, hectorite, sauconite, montmorillonite, beidellite, nontronite, stevensite, and the like. Examples of the vermiculite group include trioctahedral vermiculite, dioctahedral vermiculite, and the like. Examples of the mica group include phlogopite, biotite, lepidolite, muscovite, palagonite, chlorite, margarite, taeniolite, tetrasilicic mica, and the like. These philo-silicates may be either naturally produced or synthetically produced according to a hydrothermal reaction method, melting method, or solid phase method.

The triazine compound, used in the present invention, is a compound that specifically functions as a flame retarder for polyamide. Examples of the triazine compound may include a melamine compound, cyanuric acid compound, melamine cyanurate compound, derivatives thereof, and the like.

The melamine compound is a compound represented by the following chemical formula. In the chemical formula, $R_1$ and $R_2$ may represent either an identical or different entity, such as a hydrogen atom, methyl group, ethyl group, ethylene group, phenyl group, benzyl group, halogenophenyl group, or the like. Concrete examples of the melamine compound may include melamine, N-ethylene melamine, N,N',N''-triphenyl melamine, and the like.

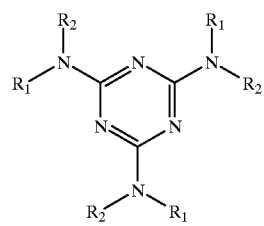

The cyanuric acid compound is a compound represented by the following chemical formula. In the chemical formula, $R_3$ may represent either an identical or different entity, such as a hydrogen atom or lower alkyl group. $R_3$ is preferably a hydrogen atom in the present invention. Concrete examples of the cyanuric acid compound may include cyanuric acid, isocyanuric acid, trimethyl cyanurate, trismethyl isocyanurate, triethyl cyanurate, trisethyl isocyanurate, tri (n-propyl) cyanurate, tris(n-propyl) isocyanurate, diethyl cyanurate, N,N'-diethyl isocyanurate, methyl cyanurate, methyl isocyanurate, and the like.

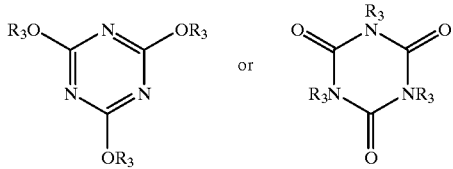

The aforementioned melamine cyanurate compound is a reactant comprising equivalent molar amounts of a melamine compound and cyanuric acid compound, and can be produced, for example, by means of mixing a melamine aqueous solution and cyanuric acid aqueous solution to promote the reaction while stirring at a temperature of approximately 90~100° C., and filtrating the resultant precipitate. The resultant product is a white solid, which is used in the form of a ground powder. Alternatively, a commercially available product may be used in its original form or in the form of a ground powder.

Examples of the triazine compound derivative may include a mixture of the aforementioned triazine compound and a Lewis acid compound. The Lewis acid is an electron pair acceptor, examples of which may include hydroacids such as hydrochloric acid and hydrogen sulfide; oxoacids such as sulfuric acid, nitric acid, acetic acid, phosphoric acid, and the like; thio acids such as ethylxanthogenic acid; alkyl halide chlorides; acid halides; and the like.

The blending amount of the lewis acid is generally 0.01~3 mol, and preferably 0.1~2 mol, per 1 mol of the triazine compound.

The blending amount of the triazine compound is generally 0.1~10 times the equivalent amount, and preferably 0.3~5 times the equivalent amount of the cation exchange capacity of the layered silicate (referred to hereinafter as "CEC").

CEC is measured according to a method such as the column penetration method (disclosed in Clay Handbook, Japan Clay Society, $2^{nd}$ edition, pp. 576~577, Gihoudo Shuppan), the methylene blue absorption method (disclosed in Japan Bentonite Association Standard Test Method, JBAS107-91), and the like.

The silicate complex (b) used in the present invention can be obtained by means of mixing the aforementioned layered silicate and triazine compound, and this method is not particularly limited. Examples of the method for obtaining the silicate complex may include a method wherein the layered silicate is brought into contact with a triazine compound via a medium with affinities for both compounds; a method wherein the ingredients are mixed together in direct contact without the use of any medium; and the like. Methods in which the ingredients are brought into contact via a medium include, for example, a method in which each ingredient is uniformly dispersed in a solvent, which is subsequently mixed while stirring, followed by removal of the solvent. The method in which the ingredients are directly mixed together includes, for example, a method wherein both ingredients are simultaneously added into a ball mill or mortar, and then ground together.

The blending amount of the silicate complex (b) is preferably 0.01~10 parts by weight, and more preferably 0.05~5 parts by weight, per 100 parts by weight of the polyamide (a).

Examples of the fibrous reinforcement (c) may include whiskers such as aluminum borate, silicon nitride, potassium titanate, and the like; and fibrous inorganic fillers such as glass fiber, carbon fiber, wallastonite, and the like. These fibrous reinforcements are not particularly constrained by their form, size, manufacturing method, and the like, and may be appropriately selected according to the objective. In addition, the fibrous reinforcement (c) may be a filler which surface is pre-treated with a coupling agent. Examples of the coupling agent may include a silane coupling agent, titanate coupling agent, aluminate coupling agent, and the like. Examples of the silane coupling agent may include triethoxy silane, vinyltris(2-methoxyethoxy) silane, N-(2-aminoethyl) 3-aminopropylmethyldimethoxy silane, N-(2-aminoethyl) 3-aminopropyltrimethoxy silane, 3-aminopropyltrimethoxy silane, 3-aminopropyltriethoxy silane, 3-glucidoxypropyltrimethoxy silane, 3-glucidoxypropylmethyldimethoxy silane, 2-(3,4-epoxycyclohexyl) etbyltrimethoxy silane, 3-chloropropylmethyldimethoxy silane, 3-chloropropyltrimethoxy silane, 3-methacryloxypropyltrimethoxy silane, 3-mercaptopropyltrimethoxy silane, and the like. Examples of the titanate coupling agent may include isopropyltriisostearoyl titanate, isopropyl oris(dioctylbyrophosphate), isopropyl tri(N-aminoetbyl-aminoethyl) titanate, tetraoctyl bis (ditridecylphosphite) titanate, tetra(2,2-diallyloxymethyl-1-butyl) bis(ditridecyl) phosphite titanate, bis (dioctylbyrophosphate) oxyacetate titanate, bis (dioctylbyrophosphate) ethylene titanate, isopropyltrioctanoyl titanate, isopropyldimethacrylisostearoyl titanate, isopropyltridodecyl benzene sulfonyl titanate, isopropylisostearoyldiacryl titanate, isopropyl tri (dioctylphosphate) titanate, isopropyltricumylphenyl titanate, tetraisopropyl bis(dioctylphosphite) titanate, and the like. Further, examples of the aluminate coupling agent may include acetoalkoxyaluminum diisopropylate, and the like.

The blending amount of the fibrous reinforcement (c) may be selected from a wide range according to the use. However, when considering the flame-resistance, mechanical property, and heat stability of the polyamide composite material, the blending amount is preferably 0.1~60 parts by weight, and more preferably, 1~50 parts by weight per 100 parts by weight of the polyamide resin (a).

Examples of the flame retarder (d) used in the present invention may include a triazine compound, phosphate compound, metal compound, organic halide compound, and the like.

Concrete examples may include triazine compounds such as melamine, cyanuric acid, melamine cyanurate, and the like; phosphate compounds such as phosphoric ester, ammonium polyphosphate, red phosphorus, and the like; metal compounds such as magnesium hydroxide, aluminum hydroxide, ammonium aluminum hydroxycarbonate, zinc borate, molybdenum compound, ferrocene, inorganic complex salt, tin compounds, and the like; and organic halide compounds such as brominated polyphenylene ether, brominated polystyrene, brominated bisphenol type epoxy resin, brominated cross-linked aromatic polymer, and the like.

The blending amount of the aforementioned flame retarder (d) may be selected from a wide range according to the use. However, when considering the flame-resistance, mechanical property, and heat stability of the polyamide composite material, the blending amount is preferably 0.1~50 parts by weight, and more preferable 1~40 parts by weight per 100 parts by weight of the polyamide resin (a).

Furthermore, in addition to the aforementioned flame retarder (d), a flame retardation auxiliary agent (e) may be added, if necessary. Examples of the flame retardation auxiliary agent (e) may include antimony compounds such as antimony trioxide, antimony pentoxide, and the like; metallic oxides such as copper (II) oxide, iron (III) oxide, and the like; zinc borate; barium methaborate; zirconium oxide; ammonium polyphosphate; and the like.

The highly-rigid, flame-resistant polyamide composite material according to the present invention (hereinafter, referred to as composite material), can be obtained by means of mixing and kneading the aforementioned ingredients. The method for mixing and kneading is not particularly limited, and may include conventional methods employed in the field of synthetic resins. Examples may include a method wherein the ingredients are mixed sufficiently by means of a tumbler, Henschel mixer, ribbon mixer, or the like, and subsequently melted and kneaded by means of melt-kneading machine such as a Banbury mixer, rotor-equipped continuous mixer, twin screw extruder, and the like. Furthermore, other examples of the method for obtaining the composite material may include a method wherein a raw material of the polyamide resin such as caprolactum; oligomer; or the like, is used instead of the polyamide resin, to which all other ingredients are added for polymerization via melting. The resultant mixture is subsequently sheared and mixed by means of an extruder, or the like. In addition, other examples may include a method in which the mixing is performed during the process of polymerization via melting, or after said polymerization by melting but before pelletizing.

In addition, in manufacturing the composite material according to the present invention, various additives conventionally used in this technical field, such as antioxidants, UV absorbents, lubricants, antistatic agents, colorants, reinforcement, and the like, may be added, as long as they do not deprive the effects of the present invention.

Further, other thermoplastic resins may be mixed into the composite material according to the present invention. The types of the thermoplastic resin are not particularly limited, and concrete examples may include polyolefin resins such as polypropylene resin, polyethylene resin, and the like; styrene resins such as polystyrene, polystyrene-butadiene copolymer, and the like; resins having a nitrile group such as acrylonitrile-styrene copolymer, acrylonitrile-butadiene-styrene copolymer, and the like; aromatic polyester resins such as polyethylene terephthalate, polybutylene terephthalate, and the like; resins having an ester group such as aliphatic polyester such as polyethylene succinate, poly-lactic acid, and the like; polyacetal resin; fluororesin; silicone resin; polyurethane resin; polycarbonate resin; polyimide resin; various elastomers; and the like. Further examples of the thermoplastic resin may include super engineering plastics such as polyphenylene sulfide, polyether sulfone, liquid crystal resin, and the like. The blending amount of these other thermoplastic resins is preferably not greater than 60 parts by weight per 100 parts by weight of the polyamide resin (a), in order to make the most of characteristics of polyamide resins.

EXAMPLES

In the following, the present invention is more specifically described using examples; however, the present invention is not limited thereto.

The method for measuring each property is described in the following.

(1) Flexural modulus

Measured according to ASTM D791.

(2) Deflection temperature under load

Measured according to ASTM D648.

(3) Value of deformation from warp

Deformation from warp of a plate with a size of 100 mm×100 mm×2 mm, produced by means of injection molding, was measured, and the maximum value was recorded as the value of deformation from warp.

(4) Molding-shrinkage and anisotropy

Molding-shrinkage is the difference in the size between the molded product and mold, expressed as a percentage. The shrinkage was measured both in the machine direction of the aforementioned plate (referred to as MD) and transverse direction (referred to as TD). Additionally, the difference between MD and TD (i.e., MD−TD) was recorded as anisotropy.

(5) Flame-resistance

A test piece with a size of 5 inches (in)×½ in×⅓ in was produced by means of injection molding, and testing for flame-resistance was performed according to U.S. Underwriters Laboratories, Safety Standard, UL-94.

(6) Amount of mold deposit

After 300 plates were molded using an injection molding machine, the amount of material attached to the parting line of the mold was weighed in milligrams.

(7) Bleed-out

A plate was left for 500 hours in a thermohydrostat at a temperature of 40° C. with a humidity of 95% RH, and bleed-out from its surface was visually observed, and judged according to the following criteria.

○: No bleed-out was observed.

Δ: Some bleed-out was observed.

X: Significant bleed-out was observed.

(8) Appearance

Roughness, bubbles, color, and the like of the plate surface were visually observed, and judged according to the following three criteria.

○: Favorable

Δ: Somewhat unfavorable

X: Unfavorable Additionally, polyamide 66 (A216, manufactured by Showa Denko K.K.) (referred to hereinafter as "PA66"), and polyamide 6 (C216, manufactured by Showa Denko K.K.), (referred to hereinafter as "PA 6") were used as the polyamide resin (a). Aluminum borate whisker with an average fiber diameter of 0.5~1.0 μm and average fiber length of 10~30 μm, (referred to as whisker, hereinafter), and glass fiber with an average fiber diameter of 10~μm and average fiber length of 6 mm (referred to hereinafter as "GF"), were used as the fibrous reinforcement (c). Melamine cyanurate with an average grain diameter of 10~30 μm and brominated polyphenylene ether (PO-64P, manufactured by Great Lakes Chemical Corp.) (referred to hereinafter as "Br-containing flame retarder"), were used as the flame retarder (d).

Furthermore, antimony trioxide was used as the flame retardation auxiliary agent (e).

Manufacturing example of the silicate complex (b)

200 g of synthetic mica (ME-100 with CEC of 80 meq/100 g, manufactured by Co-op Chemical Co., ltd.) as a layered silicate was dissolved in 10 liters of distilled water at 60° C. Additionally, after the equivalent amount (to CEC) of melamine (commercially available agent) and hydrochloric acid were dispersed in 0.5 liters of distilled water, the solution was stirred for one hour at 60° C., to prepare a melamine derivative aqueous solution. The resultant solution was added to the aforementioned, layered silicate dispersed solution, and stirred for one hour at 60° C. The resultant precipitate was washed, filtrated, and dried, and subsequently ground to grains with an average diameter of 5 microns, to yield a silicate complex, (referred to hereinafter as "complex A").

The melamine derivative inserted between the layers of the complex A was confirmed by means of measuring the distance between layers, using an X-ray diffractometer (RINT2000 with CuKα-40 kV and 20 mA, manufactured by Rigaku Corporation) to confirm that the distance between layers extended to 12.8 Å (the distance between layers of the synthetic mica=9.6 Å).

Additionally, the melamine derivative content was measured using a apparatus for thermogravimetry and differential thermal analysis (TG-DTA, manufactured by Seiko Instruments Inc.), which resulted in a content of 8% by weight.

A silicate complex (referred to as complex B, hereinafter), was obtained in the same manner as in the aforementioned, with an exception of using montmorillonite (Kunipia-F with CEC of 119 meq/100 g manufactured by Kunimine Industries Co., Ltd.) as a layered silicate. The distance between layers of the complex B was 13 Å, and the melamine content was 15% by weight.

Silicate complex (referred to hereinafter as "complex C") was obtained in the same manner as in the aforementioned complex A, with the exception that a melamine cyanurate was used instead of melamine. The distance between layers of the complex C was 15 Å, and the melamine cyanurate content was 24% by weight. 100 g of synthetic mica (ME-100) and melamine (commercially available agent) in an amount equivalent to twice the CEC were added into a ball mill, and ground together for six hours, to yield a silicate complex (referred to hereinafter as "complex D"). The distance between layers of the complex D was 13.5 Å, and the melamine content was 15.5% by weight.

Additionally, the following silicate complex was manufactured for the sake of comparison.

200 g of synthetic mica (ME-100) was dissolved in 10 liters of distilled water at 60° C., into which dioctadecyldimetbyl ammonium chloride (commercially available agent) was added in an amount equivalent to the ionic exchange capacity of the layered silicate, and stirred for one hour at 60° C. The resultant precipitate was washed, filtrated, and dried, and subsequently ground into grains having an average diameter of 5 microns, to yield a lipophilic silicate complex (hereinafter referred to as "complex E"). The distance between layers of the complex E was 35 Å, and the organic component content was 40% by weight.

Examples 1~12 and Comparative Examples 1~4

Among the ingredients shown by type and blending ratio in the Tables 1 and 2, the polyamide resin (a), silicate complex (b), and flame retarder (d) were mixed in advance using a tumbler, and subsequently supplied to a parallel twin screw extruder (PCM-30, manufactured by Ikegai Tekko K.K.). Other ingredients were supplied during the process of extruding by means of a weight feeder, to yield a pellet. Test pieces for each test were produced from the resultant pellet, using an injection molding device (Sycap 75t, manufactured by Sumitomo Heavy Industries, Ltd.), and the individual properties of each were measured. These results are shown below in Tables 3 and 4.

For Comparative Example 3, talc (Micron White #5000S, manufactured by Hayashi Kasei Co., Ltd.) was used instead of the silicate complex (b).

TABLE 1

| | Polyamide resin (a) | | Silicate complex (b) | | Fibrous reinforcement (c) | |
|---|---|---|---|---|---|---|
| | Type | Blending amount (parts by weight) | Type | Blending amount (parts by weight) | Type | Blending amount (parts by weight) |
| Example 1 | PA66 | 100 | Complex A | 1 | Whisker | 8 |
| Example 2 | PA66 | 100 | Complex A | 0.5 | Whisker | 8 |
| Example 3 | PA66 | 100 | Complex A | 1 | GF | 15 |
| Example 4 | PA66 | 100 | Complex A | 1 | GF | 30 |
| Example 5 | PA66 | 100 | Complex A | 1 | GF | 15 |
| Example 6 | PA66 | 100 | Complex B | 1 | GF | 15 |
| Example 7 | PA66 | 100 | Complex C | 1 | GF | 15 |
| Example 8 | PA66 | 100 | Complex D | 1 | GF | 15 |
| Comparative Example 1 | PA66 | 100 | Complex E | 1 | Whisker | 8 |
| Comparative Example 2 | PA66 | 100 | Complex E | 1 | GF | 15 |
| Comparative Example 3 | PA66 | 100 | talc | 10 | GF | 15 |
| Comparative Example 4 | PA66 | 100 | none | 0 | Whisker | 8 |
| Comparative Example 5 | PA66 | 100 | none | 0 | GF | 15 |

TABLE 2

| | Flame retarder (d) | | Flame retardation auxiliary (e) | |
|---|---|---|---|---|
| | Type | Blending amount (parts by weight) | Type | Blending amount (parts by weight) |
| Example 1 | Melamine cyanurate | 6.5 | none | 0 |
| Example 2 | Melamine cyanurate | 6.5 | none | 0 |
| Example 3 | Br-containing flame retarder | 20 | Antimony trioxide | 5 |
| Example 4 | Br-containing flame retarder | 20 | Antimony trioxide | 5 |
| Example 5 | Br-containing flame retarder | 20 | Antimony trioxide | 5 |
| Example 6 | Br-containing flame retarder | 20 | Antimony trioxide | 5 |
| Example 7 | Br-containing flame retarder | 20 | Antimony trioxide | 5 |
| Example 8 | Br-containing flame retarder | 20 | Antimony trioxide | 5 |
| Comparative Example 1 | Melamine cyanurate | 6.5 | none | 0 |
| Comparative Example 2 | Br-containing flame retarder | 20 | Antimony trioxide | 5 |
| Comparative Example 3 | Br-containing flame retarder | 20 | Antimony trioxide | 5 |
| Comparative Example 4 | Melamine cyanurate | 6.5 | none | 0 |
| Comparative | Br-containing flame | 20 | Antimony | 5 |

TABLE 2-continued

| | Flame retarder (d) | | Flame retardation auxiliary (e) | |
|---|---|---|---|---|
| | Type | Blending amount (parts by weight) | Type | Blending amount (parts by weight) |
| Example 5 | retarder | | trioxide | |

TABLE 3

| | Flexural modu-lus GPa | Deflection temperature under load °C., 1.82 MPa | Value of deformation from warp mm | Molding-shrinkage | |
|---|---|---|---|---|---|
| | | | | %, MD | %, TD |
| Example 1 | 5.8 | 212 | 0.2 | 0.71 | 0.74 |
| Example 2 | 5.6 | 210 | 0.3 | 0.70 | 0.76 |
| Example 3 | 6.5 | 245 | 0.5 | 0.50 | 0.95 |
| Example 4 | 9.8 | 255 | 0.8 | 0.41 | 0.88 |
| Example 5 | 6.3 | 245 | 0.5 | 0.50 | 0.97 |
| Example 6 | 6.1 | 244 | 0.7 | 0.51 | 0.95 |
| Example 7 | 6.2 | 244 | 0.7 | 0.50 | 0.98 |
| Example 8 | 5.9 | 240 | 1.0 | 0.52 | 1.10 |
| Comparative Example 1 | 5.6 | 201 | 0.6 | 0.70 | 0.75 |
| Comparative Example 2 | 5.8 | 230 | 1.2 | 0.51 | 0.96 |
| Comparative Example 3 | 6.0 | 243 | 1.0 | 0.48 | 1.02 |
| Comparative Example 4 | 5.5 | 208 | 3.5 | 0.68 | 0.82 |
| Comparative Example 5 | 5.6 | 244 | 6.2 | 0.53 | 1.22 |

TABLE 4

| | Anisotropy TD-MD | Flame-resistance UL-94 | Mold deposit mg | Bleed-out | Appearance |
|---|---|---|---|---|---|
| Example 1 | 0.03 | V-0 | 0.3 | ○ | ○ |
| Example 2 | 0.06 | V-0 | 0.7 | Δ | ○ |
| Example 3 | 0.45 | V-0 | 0.1 | ○ | ○ |
| Example 4 | 0.47 | V-0 | 0.1 | ○ | ○ |
| Example 5 | 0.47 | V-0 | 0.1 | ○ | ○ |
| Example 6 | 0.44 | V-0 | 0.1 | ○ | ○ |
| Example 7 | 0.48 | V-0 | 0.1 | ○ | ○ |
| Example 8 | 0.58 | V-0 | 0.3 | ○ | ○ |
| Comparative Example 1 | 0.05 | HB | 2.6 | ○ | ○ |
| Comparative Example 2 | 0.45 | V-2 | 0.1 | ○ | ○ |
| Comparative Example 3 | 0.54 | V-0 | 0.1 | ○ | Δ |
| Comparative Example 4 | 0.14 | V-0 | 4.8 | X | Δ |
| Comparative Example 5 | 0.69 | V-0 | 0.3 | ○ | X |

INDUSTRIAL APPLICABILITY

The highly-rigid, flame-resistant polyamide composite material according to the present invention exhibits a high flame-resistance, i.e., the equivalent if V-0 according to the UL-94 standard, and exhibits a superior performance with respect to its mechanical property, thermal property, dimensional stability of molded products, and reduced warp. In addition, due to its favorable appearance and processing property, it provides a composite material that is applicable to various uses, for example, as materials for electric and electronic parts, automobile parts, materials for house appliances, mechancical parts, and the like, being processed as various molded products, film, and fiber.

What is claimed is:

1. A highly-rigid, flame-resistant polyamide composite material, characterized in comprising (a) polyamide resin; (b) silicate complex comprising a layered silicate and triazine compound; (c) fibrous reinforcement; and (d) flame retarder.

2. A highly-rigid, flame-resistant polyamide composite material according to claim 1, further comprising 100 parts by weight of said polyamide (a); 0.01~10 parts by weight of said silicate complex (b); 0.1~60 parts by weight of said fibrous reinforcement (c); and 0.1~50 parts by weight of said flame retarder (d).

3. A highly-rigid, flame-resistant polyamide composite material, characterized in comprising (a) polyamide resin; (b) silicate complex comprising a layered silicate and triazine compound; (c) fibrous reinforcement; (d) flame retarder; and (e) flame retardation auxiliary agent.

* * * * *